(12) United States Patent
Fujihara

(10) Patent No.: US 8,621,088 B2
(45) Date of Patent: Dec. 31, 2013

(54) COMMUNICATION SYSTEM, COMMUNICATION APPARATUS, COMMUNICATION PROGRAM, AND COMPUTER-READABLE STORAGE MEDIUM STORED WITH THE COMMUNICATION PROGAM

(75) Inventor: Masahiro Fujihara, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 191 days.

(21) Appl. No.: 12/299,207

(22) PCT Filed: Apr. 27, 2007

(86) PCT No.: PCT/JP2007/059240
§ 371 (c)(1),
(2), (4) Date: Jan. 15, 2009

(87) PCT Pub. No.: WO2007/129625
PCT Pub. Date: Nov. 15, 2007

(65) Prior Publication Data
US 2009/0222572 A1    Sep. 3, 2009

(30) Foreign Application Priority Data

May 2, 2006    (JP) .................. 2006-128734
Nov. 10, 2006    (JP) .................. 2006-306054

(51) Int. Cl.
*G06F 15/16*    (2006.01)
*G06F 15/173*    (2006.01)

(52) U.S. Cl.
USPC ........... 709/228; 709/204; 709/223; 709/224; 709/227

(58) Field of Classification Search
USPC ................. 709/223–226, 204–206; 713/400; 370/260, 261
See application file for complete search history.

(56) References Cited

U.S. PATENT DOCUMENTS 5,742,772 A * 4/1998 Sreenan ..................... 709/226
5,794,018 A * 8/1998 Vrvilo et al. ................ 713/400
(Continued)

FOREIGN PATENT DOCUMENTS

JP    6-70040 A    3/1994
JP    10-164533 A    6/1998
(Continued)

OTHER PUBLICATIONS

International Search Report for corresponding patent application PCT/JP2007/059240.

(Continued)

*Primary Examiner* — Tae Kim
(74) *Attorney, Agent, or Firm* — Matthew B. Dernier, Esq.; Gibson & Dernier LLP

(57) ABSTRACT

Multiple client apparatus 1 belonging to a predetermined communication group connected to the Internet 30 transmit and receive with each other video data corresponding to an image videotaped by a video camera 11 and audio data corresponding to voice input from a microphone 12. One of the multiple client apparatus 1 determines the number of client apparatus 1 belonging to the communication group, and decides transmission quality of the video data according to the determined number. The multiple client apparatus 1 belonging to the communication group transmits the video data according to the transmission quality.

15 Claims, 15 Drawing Sheets

(56) References Cited

U.S. PATENT DOCUMENTS

| | | | |
|---|---|---|---|
| 6,522,352 B1* | 2/2003 | Strandwitz et al. | 348/211.2 |
| 7,103,846 B1* | 9/2006 | Shafrir et al. | 715/751 |
| 7,627,629 B1* | 12/2009 | Wu et al. | 709/204 |
| 2002/0002586 A1* | 1/2002 | Rafal et al. | 709/205 |
| 2004/0015551 A1* | 1/2004 | Thornton | 709/204 |
| 2004/0119814 A1* | 6/2004 | Clisham et al. | 348/14.08 |
| 2004/0136388 A1* | 7/2004 | Schaff | 370/401 |
| 2005/0025234 A1 | 2/2005 | Kato et al. | |
| 2005/0033806 A1* | 2/2005 | Harvey et al. | 709/204 |
| 2005/0120128 A1* | 6/2005 | Willes et al. | 709/232 |
| 2005/0237952 A1* | 10/2005 | Punj et al. | 370/260 |
| 2006/0075055 A1* | 4/2006 | Littlefield | 709/206 |
| 2006/0136597 A1* | 6/2006 | Shabtai et al. | 709/231 |
| 2006/0245379 A1* | 11/2006 | Abuan et al. | 370/261 |
| 2007/0050452 A1* | 3/2007 | Raju | 709/204 |
| 2007/0083666 A1* | 4/2007 | Apelbaum | 709/231 |

FOREIGN PATENT DOCUMENTS

| | | |
|---|---|---|
| JP | 2001-057672 | 2/2001 |
| JP | 2003-153223 A | 5/2003 |
| JP | 2004-187170 A | 7/2004 |
| JP | 200520467 A | 1/2005 |
| JP | 2006-019771 A | 1/2006 |
| JP | 2006-50370 | 2/2006 |

OTHER PUBLICATIONS

Japanese Office Action for corresponding JP application 2006-306054, dated Jan. 6, 2011.

* cited by examiner

FIG. 5

| MESSAGE | |
|---|---|
| DESTINATION | XXX NO. 3 |
| SUBJECT | CHAT INVITATION 2006/5/1 |
| TEXT | WOULD YOU LIKE TO CHAT? |
| ATTACHMENT | |
| | SEND |

| MESSAGE | |
|---|---|
| SENDER | ××××× |
| DESTINATION | XXX NO. 3 |
| SUBJECT | CHAT INVITATION 2006/5/1 |
| TEXT | WOULD YOU LIKE TO CHAT? |
| ATTACHMENT | |

[PARTICIPATE] [NOT PARTICIPATE] [SEND]

MODE 1

| NUMBER OF PARTICIPANTS | RESOLUTION | TRANSMISSION FREQUENCY |
|---|---|---|
| 2 | VGA | 60fps |
| 3 | QVGA | 30fps |
| 4 | QVGA | 30fps |
| 5 | QVGA | 20fps |
| 6 | QVGA | 20fps |

FIG. 17

MODE 2

| NUMBER OF PARTICIPANTS | RESOLUTION | TRANSMISSION FREQUENCY |
|---|---|---|
| 2 | QVGA | 30fps |
| 3 | QVGA | 20fps |
| 4 | QVGA | 15fps |
| 5 | QVGA | 15fps |
| 6 | QVGA | 10fps |

FIG. 18

| TRANSMISSION BAND | CPU/MEMORY LOW-CONSUMPTION ENVIRONMENT | CPU/MEMORY HIGH-CONSUMPTION ENVIRONMENT |
|---|---|---|
| HIGH BAND (500 bps OR GREATER) | ENVIRONMENT 3 | ENVIRONMENT 1 |
| NARROW BAND (LESS THAN 500 bps) | ENVIRONMENT 4 | ENVIRONMENT 2 |

FIG. 19

| PROFILE INFORMATION | WORK MODE |
|---|---|
| ENVIRONMENT 1 | MODE 1 |
| ENVIRONMENT 2 | MODE 2 |
| ENVIRONMENT 3 | MODE 3 |
| ENVIRONMENT 4 | MODE 4 |

FIG. 20

MODE 3

| NUMBER OF PARTICIPANTS | RESOLUTION | TRANSMISSION FREQUENCY |
|---|---|---|
| 2 | VGA | 30fps |
| 3 | QVGA | 30fps |
| 4 | QVGA | 30fps |
| 5 | QVGA | 20fps |
| 6 | QVGA | 20fps |

COMMUNICATION SYSTEM, COMMUNICATION APPARATUS, COMMUNICATION PROGRAM, AND COMPUTER-READABLE STORAGE MEDIUM STORED WITH THE COMMUNICATION PROGAM

TECHNICAL FIELD

The present invention relates to optimum techniques utilized for communication systems of transmitting and receiving video data and audio data among multiple communication apparatus.

BACKGROUND ART

Conventionally, there has been a remote conference system of transmitting and receiving audio data and video data in real time among multiple remote conference apparatus connected to a network (e.g., Patent Document 1). With such a system, a user may engage in a conversation in real time while viewing a video image of another user, and may participate in a conference while at a distance.

Patent Document 1: Japanese Unexamined Patent Application Publication No. 2001-57672

DISCLOSURE OF THE INVENTION

Problem to be Solved by the Invention

However, with such a system, there is a possibility that transmission quantity of data to be transmitted or received increases each time the number of people participating in the conference increases. Therefore, the data transmission efficiency may decrease. As a result, a video image may not be able to be displayed smoothly, thereby impairing user-friendliness.

The present invention is devised through consideration of the aforementioned problems, and aims to provide a communication system capable of preventing decrease in transmission efficiency in a communication system of transmitting and receiving video data and audio data among multiple communication apparatus even if the number of communication apparatus mutually transmitting and receiving data increases.

Means of Solving the Problem

The present invention is a communication system in which a communication apparatus, which belongs to a predetermined communication group formed by a plurality of communication apparatus connected to a network, transmits to another communication apparatus belonging to the communication group, video data according to an image shot by an image shooting means and audio data according to voice input from a sound input means, receives video data and audio data transmitted from the other communication apparatus, displays on a display means a video image represented by the video data, and outputs voice represented by audio data to an audio output means. The communication system includes determination means for determining the number of communication apparatus belonging to the communication group; and decision means for deciding transmission quality of the video data according to the number determined by the determination means. The plurality of communication apparatus transmits the video data according to the transmission quality decided by the decision means.

Results of the Invention

According to the present invention, reduction in transmission efficiency may be prevented even if the number of communication apparatus mutually transmitting and receiving video data and audio data within a predetermined communication group increases.

BRIEF DESCRIPTION OF DRAWINGS

FIG. 5 exemplifies a message according to the embodiment;

FIG. 17 exemplifies correspondence relationships between number of participating users and transmission quality according to a modification of the embodiment of the present invention;

FIG. 18 exemplifies correspondence relationships between profile information and connection environment and processing environment according to the modification;

FIG. 19 exemplifies correspondence relationship between profile information and working mode according to the modification;

FIG. 20 exemplifies correspondence relationships between number of participating users and transmission quality according to a modification of the embodiment of the present invention;

DESCRIPTION OF REFERENCE NUMERALS

Figure 1:
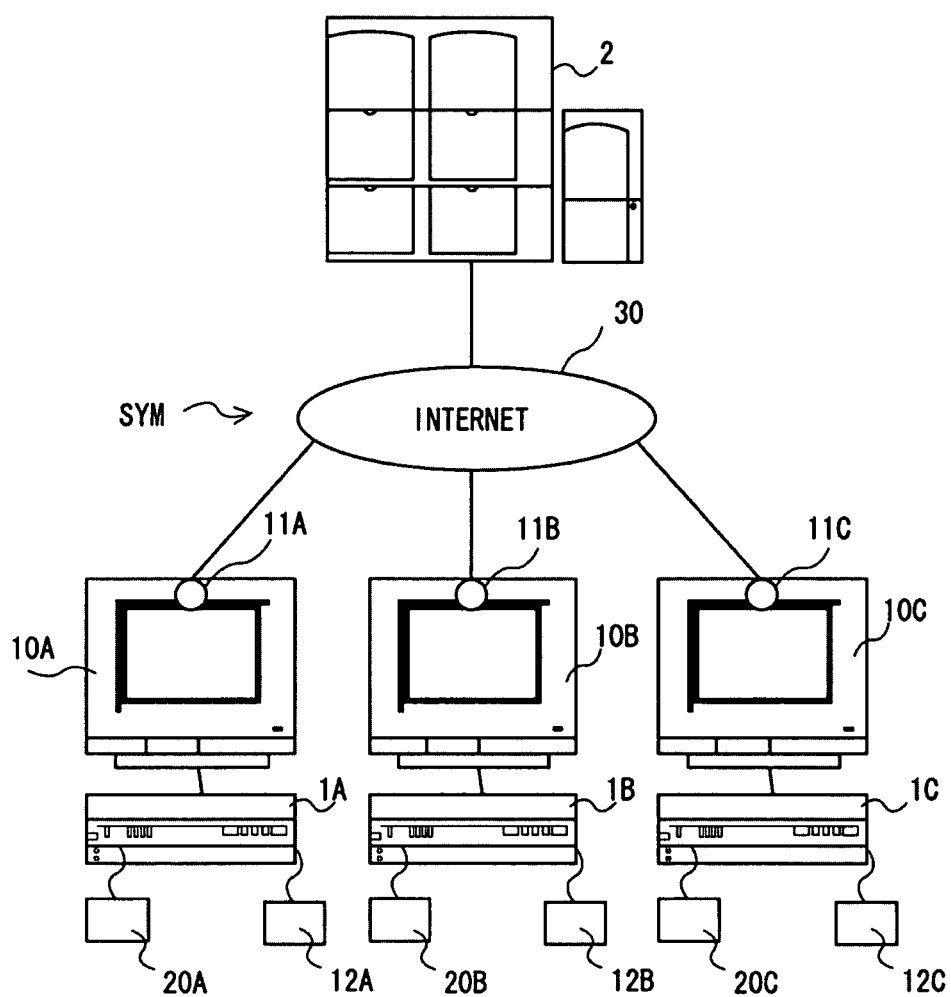
FIG. 1 is a diagram showing an outline of an AV chat system SYM according to an embodiment of the present invention.

1 . . . Client apparatus
2 . . . Server apparatus
10 . . . Monitor
11 . . . Video camera
12 . . . Microphone
20 . . . Controller
30 . . . Internet
41 . . . CPU
43 . . . Main memory
44 . . . ROM
52 . . . GPU
200 . . . CPU
210 . . . ROM
220 . . . RAM
230 . . . HD
230A . . . Friend management table
240 . . . Communication unit
SYM . . . AV chat system

BEST MODE FOR CARRYING OUT THE INVENTION

Next, a preferred embodiment of the present invention is described with reference to the appended drawings. Note that the same reference numerals are attached to the same respective elements in respective drawings. The embodiment shows only an aspect of the present invention, does not limit the scope of the present invention, and may be modified within the scope of the present invention as needed.

[Embodiments]
(1) Structure
<Structure of Audio Visual (AV) Chat System>

FIG. 1 is a diagram showing an outline of an AV chat system SYM according to this embodiment. The AV chat system SYM includes multiple client apparatus 1A, 1B, and 1C and a server apparatus 2. The server apparatus 2 conducts data communication with each of the client apparatus 1 via the Internet 30. The multiple client apparatus 1A, 1B, and 1C communicate with each other using a peer-to-peer (P2P) protocol. Note that users of these client apparatus 1A, 1B, and 1C are referred to as users A, B, and C here. Hereafter, the client apparatus 1A, 1B, and 1C are simply referred to as client apparatus 1 when it is unnecessary to distinguish them. In contrast, when the respective client apparatus need to be distinguished from each other and further when components comprising each client apparatus need to be distinguished from each other, A, B, and C are appended at the end of the respective reference numerals.

A controller 20, a monitor 10, a video camera 11, and a microphone 12 are connected to each client apparatus 1 via connection cables, which are not shown in the drawing. The controller 20 is an operation terminal operated by a user, providing an operation signal to the client apparatus 1 in conformity with the user's operation. The video camera 11 provides the client apparatus 1 with a video signal according to a videotaped image. The microphone 12 provides the client apparatus 1 with an audio signal according to an input voice. A video signal is provided to the monitor 10 from the client apparatus 1. The monitor 10 displays an image according to a video signal provided from the client apparatus 1.

In the aforementioned structure of the AV chat system SYM, the client apparatus 1 of the user participating in an AV chat transmits video data according to a video signal from the video camera 11 and audio data according to voice from the microphone 12 as chat streaming data to another client apparatus 1 that is participating in the same AV chat. Moreover, the client apparatus 1 receives the chat streaming data via the Internet 30 from another user's client apparatus 1 participating in the AV chat.

<Internal Circuit Structure of Client Apparatus>

Figure 2:
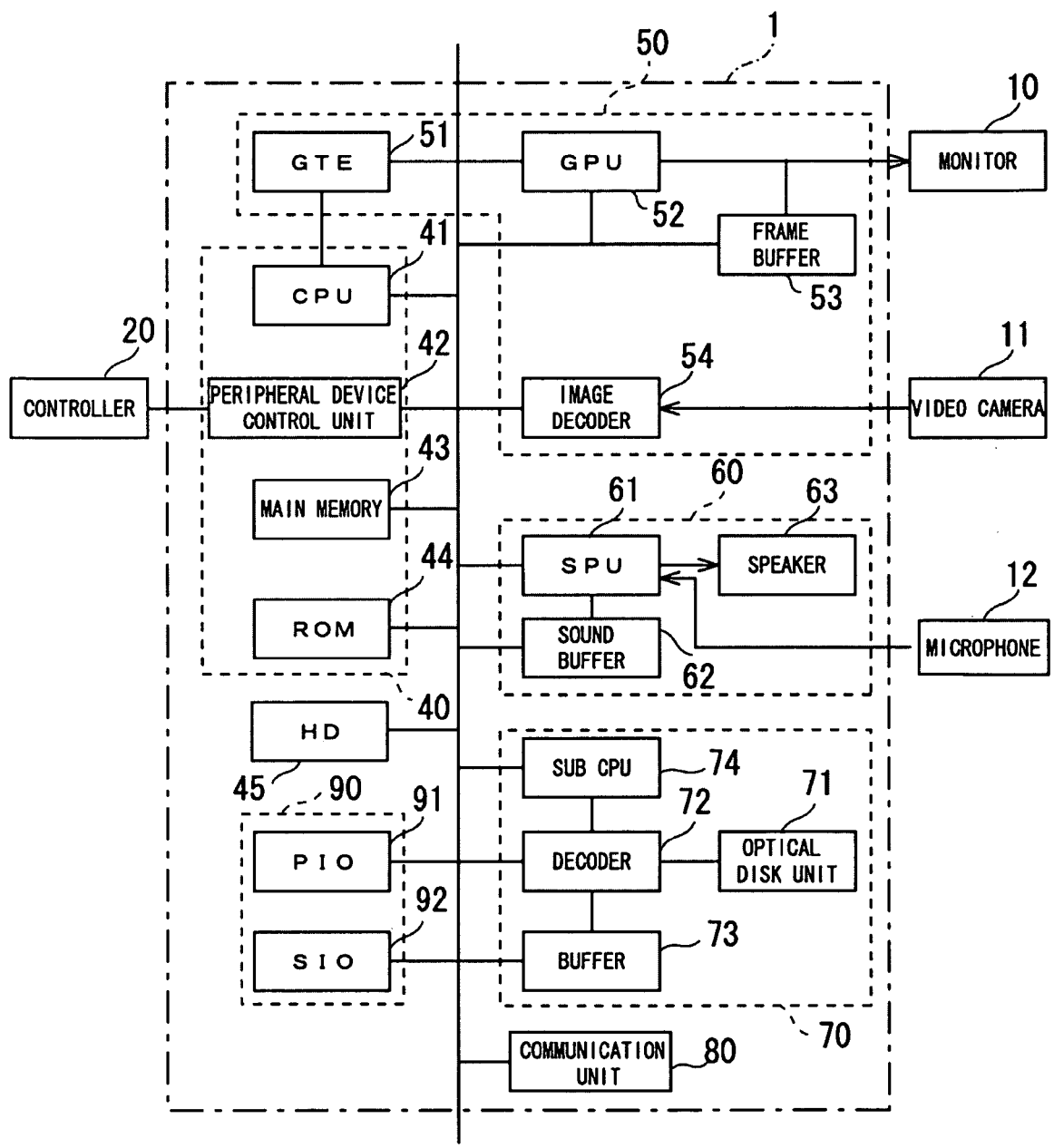
FIG. 2 is a block diagram showing an internal structure of a client apparatus according to the embodiment.

Next, referencing FIG. 2, a main internal structure of the client apparatus 1 is described. FIG. 2 is a block diagram showing the main internal structure of the client apparatus 1.

It is constituted by a control unit 40, which includes a central processing unit (CPU) 41, peripheral devices and related devices, a hard disk (HD) 45, a graphic system 50, which includes a graphics processing unit (GPU) 52 for rendering in a frame buffer 53 and related devices, a sound system 60, which includes a sound processing unit (SPU) 61 for providing musical sounds, sound effects or the like, an optical disk control unit 70 for controlling an optical disk on which application programs are recorded, a communication unit 80, an interface unit 90, and a bus to which respective components described above are connected.

The control unit 40 is constituted by the CPU 41, a peripheral device control unit 42 for controlling interrupts, direct memory access (DMA) transfers, etc., a main memory 43, which includes random access memory (RAM), and read only memory (ROM) 44.

Programs such as an operating system for controlling each component of the client apparatus 1, and application programs for implementing various functions are stored in the ROM 44. The CPU 41 controls the entirety of the client apparatus 1 by reading out the operating system stored in the ROM 44 to the main memory 43 and then executing the read-out operating system.

A variety of data and a variety of application programs such as a program for implementing AV chats (hereafter referred to as AV chat program) are stored in the HD 45. The CPU 41 reads out the AV chat program stored in the HD 45 to the main memory 43 and then executes the read-out AV chat program. Functions implemented thereby are described later in the "Operation" section.

The sound system 60 includes an SPU 61 for controlling audio signals under the control of the control unit 40, a sound buffer 62 stored with waveform data or related data for audio playback, and a speaker 63 for outputting musical sounds, sound effects or the like generated by the SPU 61. The sound system 60 receives an audio signal output from the microphone 12. The sound system 60 converts the input audio signal to a digital signal, encodes it using an audio codec, and provides it to the communication unit 80. Audio data obtained via the Internet 30 is provided to the sound system 60 from the communication unit 80. The sound system 60 decodes the audio data using an audio codec, converts it to analog waveform data, stores it in the sound buffer 62, and provides it to the speaker 63.

The optical disk control unit 70 includes an optical disk unit 71, which reproduces programs, data or the like recoded on an optical disk, a decoder 72, which decodes programs, data or the like recoded together with an error correction code (ECC), for example, and a buffer 73, which is temporarily stored with data from the optical disk unit 71 so as to speed up data read out from the optical disk. A sub-CPU 74 is connected to the aforementioned decoder 72.

The interface unit 90 includes a parallel I/O interface (PIO) 91 and a serial I/O interface (SIO) 92. These are interfaces for connecting a memory card not shown in the drawing to the client apparatus 1.

The graphic system 50 includes a geometry transfer engine (GTE) 51, a GPU 52, a frame buffer 53, an image decoder 54, and a display 3.

The GTE 51 includes, as an example, a parallel operating mechanism of executing multiple operations in parallel, and carries out coordinate transformation, calculates a light source, and calculates a matrix, a vector or the like in response to a calculation request issued by the aforementioned CPU 41. Afterwards, the control unit 40 defines a three dimensional model made up of a combination of basic shapes (polygons), such as triangles or squares, based on calculation results by the GTE 51 and sends to the GPU 52 a render command for each polygon for rendering a three dimensional image.

The GPU 52 renders a polygon or the like in the frame buffer 53 in conformity with the render command from the control unit 40. The frame buffer 53 is stored with the image rendered by the GPU 52. This frame buffer 53 is constituted by dual-port RAM, which allows the GPU 52 to render or the main memory 43 to transfer and read out for displaying in parallel. In addition, this frame buffer 53 includes a CLUT region stored with a color look up table (CLUT), which is accessed by the GPU 52 when rendering a polygon or the like, and a texture region stored with a material (texture) to be inserted (mapped) to a polygon or the like, which is subjected to coordinate conversion and rendered by the GPU 52 when being rendered, as well as a display region from which is output a video signal. These CLUT region and texture region are changed dynamically according to the update of the display region or the like.

The image decoder 54 encodes or decodes a still image or a moving image, or subjects it to digital or analog conversion or other various processing under the control of the aforementioned control unit 40.

A video signal is provided to the graphic system 50 from the video camera 11. The graphic system 50 converts the video signal to a digital signal, encodes (compresses) it using a video codec, and provides it to the communication unit 80. Moreover, the video signal converted to a digital signal is provided to the monitor 10. Furthermore, video data obtained via the Internet 30 is provided to the graphic system 50 from the communication unit 80. The graphic system 50 decodes (decompresses) the video data using a video codec, converts it to analog data, and provides it to the monitor 10.

The communication unit 80 controls data communication with other information processing units via the Internet 30 under the control of the control unit 40. The communication unit 80 transmits via the Internet the video data provided from the graphic system 50 and the audio data provided from the sound system 60 as chat streaming data to another client apparatus 1 participating in the AV chat. Moreover, the communication unit 40 receives the chat streaming data transmitted via the Internet 30 from the other client apparatus 1 participating in the AV chat, provides the video data to the graphic system 50, and then provides the audio data to the sound system 60.

<Structure of Server Apparatus>

Figure 3:
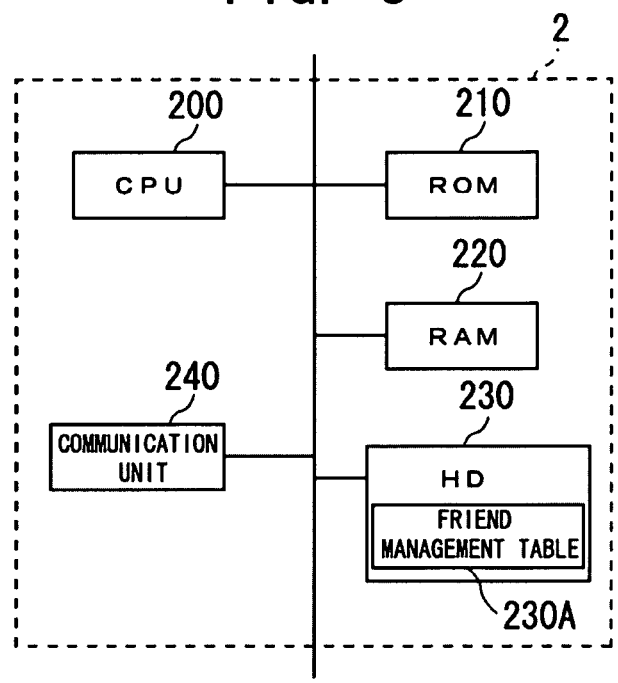
FIG. 3 is a block diagram showing an internal structure of a server apparatus according to the embodiment.

Next, referencing FIG. 3, a main internal structure of the server apparatus 2 is described. FIG. 3 is a block diagram showing the main internal structure of the server apparatus 2.

The server apparatus 2 is constituted by a CPU 200, ROM 210, RAM 220, a hard disk (HD) 230, and a communication unit 240, all of which are connected via a bus.

The ROM 210 is stored with an operating system, which controls respective units of the server apparatus 2, and a variety of programs. The CPU 200 controls the respective units of the server apparatus 2 by reading out the operating system stored in the ROM 210 to the RAM 220 when the server apparatus 2 is started, and executing the read-out operating system.

The communication unit 240 controls data communication via the Internet 30 under the control of the CPU 200.

The HD 230 is stored with a friend management table 230A. The friend management table 230A is stored with user information of a user allowed to utilize the AV chat system SYM, and friend information associated with the user information. Note that a user follows a predetermined procedure to utilize the AV chat system SYM, resulting in storing the user information for the user in the friend management table 230A. It is assumed herein that the pieces of user information for respective users of the client apparatus 1A, 1B, and 1C are prestored in the friend management table 230A. The user information is information for identifying users, and includes, for example, user IDs for identifying respective users specifically, user email addresses, user nicknames, avatars selected by users, and other related information. The friend information designates other users whose friends are preregistered by users, showing user information for the other users. Registration of friends is carried out in the following manner: Once the user of the client apparatus 1 has run a predetermined operation via the controller 20, the client apparatus 1 carries out data communication with the server apparatus 2 and another client apparatus 1 of another user registered as a friend, receives data that grants registration the client apparatus 1 of the other user is granted, and thereby registers the user information of the other user as friend information.

(2) Operation

Next, an operation of the embodiment is described.

Note that once a power source (not shown in the drawing) of the client apparatus 1 is turned on, a program such as an operating system stored in the ROM 44 is read out to the main memory 43 and then executed by the CPU 41, and when a command is entered by a user, a variety of programs read out to the main memory 43 from the ROM 44 or the optical disk mounted in the optical disk unit 71 are executed by the CPU 41, a variety of functions as described in the "Structure" section above are implemented.

On the other hand, once a power source (not shown in the drawing) of the server apparatus 2 is turned on, a program such as an operating system stored in the ROM 210 is read out to the RAM 220 and then executed by the CPU 200, and when a command is entered by a user, a variety of programs such as a game control program read out to the RAM 220 are executed by the CPU 200, a variety of functions as described in the "Structure" section above are implemented.

Note that with this embodiment, once a user gives a command of starting an AV chat or inviting another user through a client apparatus 1 or master of the multiple client apparatus 1 connected to the AV chat system SYM while the other user gives a command of accepting participation in the AV chat through another client apparatus 1, AV chatting is carried out between these client apparatus 1. In other words, these client apparatus 1 form a communication group to AV chat. Note that the master has a right to invite a participator and decide topology and transmission quality described later. Herein, it is assumed that the client apparatus 1 selected as a master is the client apparatus 1A. Moreover, the number of users that can participate in this AV chat, namely number of the client apparatus 1 that can belong to this communication group is limited from 2 to 6.

<Preparation for Starting AV Chat>

Figure 4:
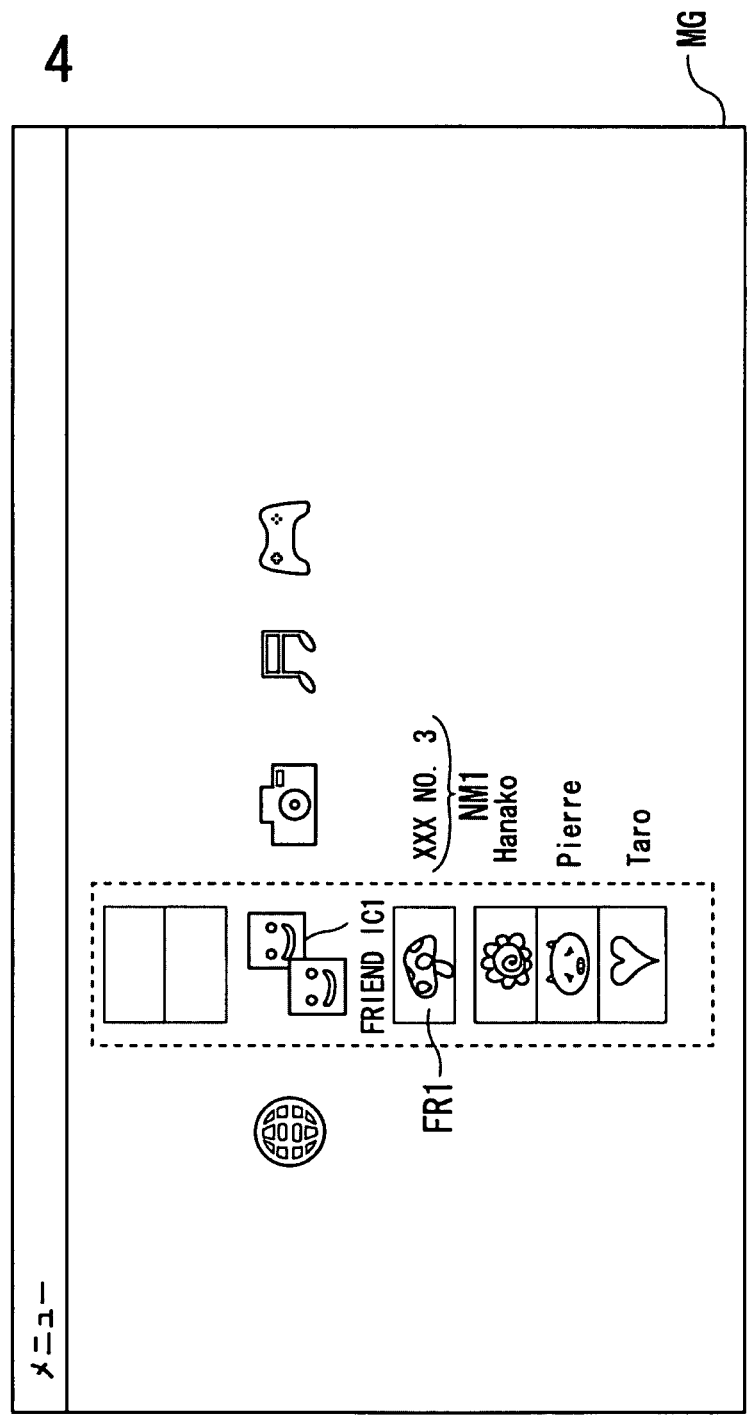
FIG. 4 exemplifies a menu screen MG according to the embodiment.

First, the user A operates a controller 20A connected to the client apparatus 1A so that a menu screen is displayed. A CPU 41A accesses the server apparatus 2 via a communication unit 80A and transmits to the server apparatus 2 request data to the effect of requesting for friend information, which is stored associated with the user information of the user. This request data includes information such as user ID of the user A, for example. On the other hand, once the server apparatus 2 receives the request data transmitted from the client apparatus 1A, it refers to a friend management table 230A stored in the HD 230 according to the request data, transmitting friend information associated with the user information of the user A to the client apparatus 1A. Once the CPU 41A of the client apparatus 1A receives the friend information transmitted from the server apparatus 2, it then issues a command of rendering a menu screen with this friend information to a graphic system 50A. The graphic system 50A renders an image for the menu screen in conformity with the rendering command. The CPU 41A provides to the monitor 10A a video signal for the rendered image for the menu screen. As a result, a menu screen MG as shown in FIG. 4, for example, is displayed on the monitor 10A. A chat icon IC1 symbolizing the function of AV chatting is displayed on the menu screen MG, and friend information preregistered by the user A and received from the server apparatus 2 is expanded and displayed in the vertical direction of the chat icon IC1. In this case the displayed friend information is an avatar FR1 or a nickname NM1 of another user registered as a friend, for example. The user A operates the controller 20A to select from this friend information a partner with whom the user A wants to start AV chatting. Afterwards, when the user A operates the controller 20A for displaying an option menu, an option menu (not shown in the drawing) is displayed on the right side of the menu screen. Moreover, the user A operates the controller 20A to select 'start AV chat' from commands displayed in the option menu, thereby commanding to start AV chatting. In response thereto, the CPU 41A reads out an AV chat program from an HD 45B to a main memory 43B and then executes it. Afterwards, the CPU 41A refers to the friend information selected by the user, generates an invitation message for a user corresponding to the friend information, and then displays it on the monitor 10. More specifically, an invitation message template, for example, is prestored in the HD 45, and the CPU 41A reads out the invitation message template from the HD 45, and based thereon, adds information such as a nickname given by the friend information as a destination so as to generate an invitation message. Such generated invitation message displayed on the monitor 10 is exemplified in FIG. 5, for example.

Figure 6:
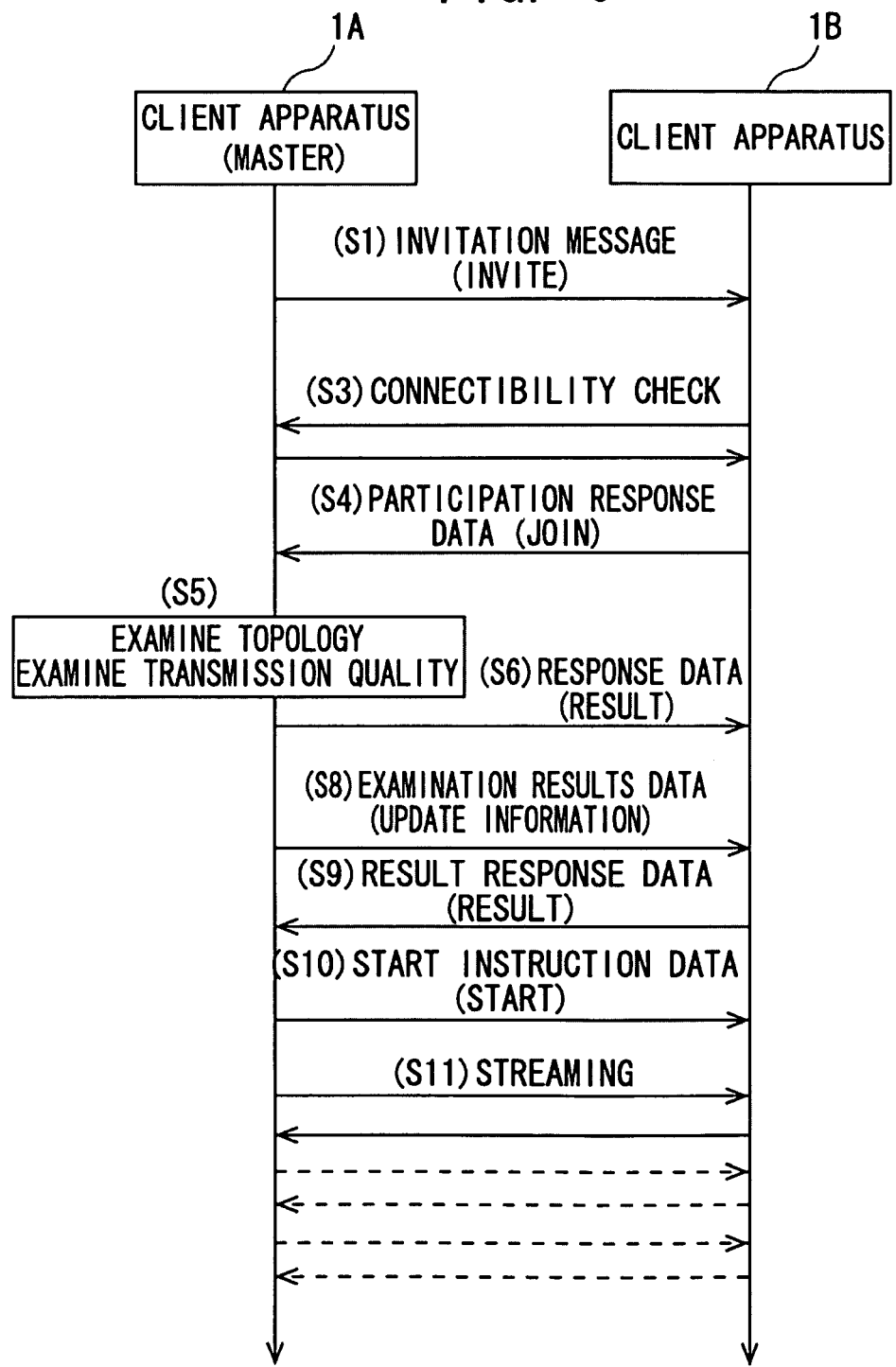
FIG. 6 is a sequence chart describing a processing flow for client apparatus 1A and 1B according to the embodiment.

Next, a flow of subsequent operations is described while referencing the flowchart of FIG. 6. FIG. 6 is a sequence chart describing a processing flow for data communication between the client apparatus 1A and 1B.

Once the user A operates the controller 20 to decide and give a command to transmit the invitation message, the client apparatus 1A transmits the invitation message to the client apparatus 1 (referred to as client apparatus 1B here) of the user (referred to as user B here) at the destination for the invitation message via the server apparatus 2 (Step S1).

On the other hand, the client apparatus 1B that has received the invitation message transmitted from the client apparatus 1A displays the invitation message on a monitor 10B. The invitation message displayed on the monitor 10B is exemplified in FIG. 7, for example. At this time, once the user B of the client apparatus 1B operates the controller 20B to give a command to participate in the AV chat, the client apparatus 1B reads out the AV chat program from the HD 45B to the main memory 43B and executes it. Afterwards, the client apparatus 1B transmits connection confirmation data to the client apparatus 1A for checking connectibility with the client apparatus 1A (Step S3). Upon reception of the connection confirmation data transmitted from the client apparatus 1B, the client apparatus 1A transmits to the client apparatus 1B connection response data indicating to the effect that the data has been received.

Upon reception of the connection response data, the client apparatus 1B determines that it is connectible to the client apparatus 1A and transmits to the client apparatus 1A participation response data indicating to the effect of participating in the AV chat (Step S4). Note that this participation response data includes user ID of the user B and the like.

On the other hand, once the client apparatus 1A receives the participation response data transmitted from the client apparatus 1B, the client apparatus 1A examines and decides the topology and determines the number of users participating in the AV chat (participating users), deciding resolution and transmission frequency (hereafter referred to as transmission quality) when the respective client apparatus 1 transmits respective video data. Correspondence relationships between transmission quality and number of participating users, for example, are given in the table of FIG. 8. Note that resolution represents number of pixels per unit area included in image data per frame constituting the video data. Resolutions used here are VGA and QVGA. QVGA indicates a resolution of 320×240 pixels, and VGA indicates resolution of 640×480 pixels. Moreover, transmission frequency represents number of frames transmitted in 1 second (fps).

Figures 7, 8, 9:
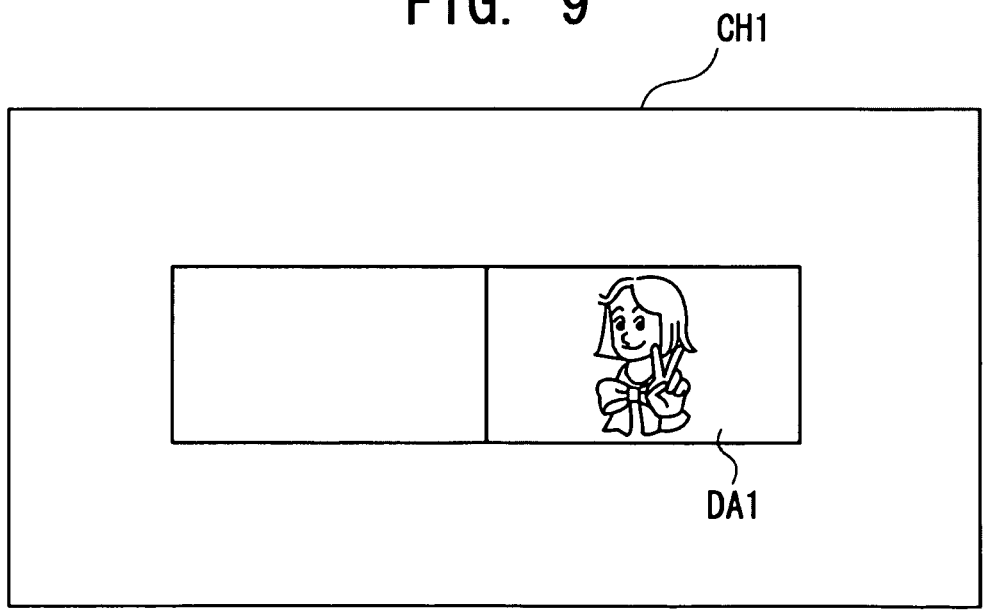
FIG. 7 exemplifies a message according to the embodiment.
FIG. 8 exemplifies correspondence relationships between number of participating users and transmission quality according to the embodiment.
FIG. 9 exemplifies a chat screen according to the embodiment.

Referencing the correspondence relationship shown in FIG. 8, the number of participating users in this case is 2, and therefore transmission quality decided in Step S5 is VGA and 60 fps. Moreover, the topology decided here is made from two simply connected nodes: the client apparatus 1A and 1B. Next, in Step S6, the client apparatus 1A transmits to the client apparatus 1B response data indicating to the effect of accepting participation. In addition, in step S8, it transmits the topology and transmission quality decided in Step S5 as examination results data to the client apparatus 1B.

On the other hand, upon reception of the examination results data transmitted from the client apparatus 1A, the client apparatus 1B transmits to the client apparatus 1A results response data indicating to the effect of responding to the data (Step S9).

Next, upon reception of the results response data transmitted from the client apparatus 1B, the client apparatus 1A transmits to the client apparatus 1B start instruction data indicating to the effect of starting the AV chat (Step S10). Moreover, the client apparatus 1A displays on the monitor 10A a chat screen CH1 as shown in FIG. 9. A video image DA1, which corresponds to a video signal input from a video camera 11A connected to the client apparatus 1A, is displayed on the right side of the chat screen CH1. The client apparatus 1A stands by until video data is transmitted from the client apparatus 1B in order to display the aforementioned video image corresponding to the video data transmitted from the client apparatus 1B on the left side of the screen. Moreover, the client apparatus 1A transmits to the client apparatus 1B via the communication unit 80 the video data corresponding to the video signal input from the video camera 11A connected to the client apparatus 1A, and audio data corresponding to voice input from a microphone 12A as chat streaming data.

Figure 10:
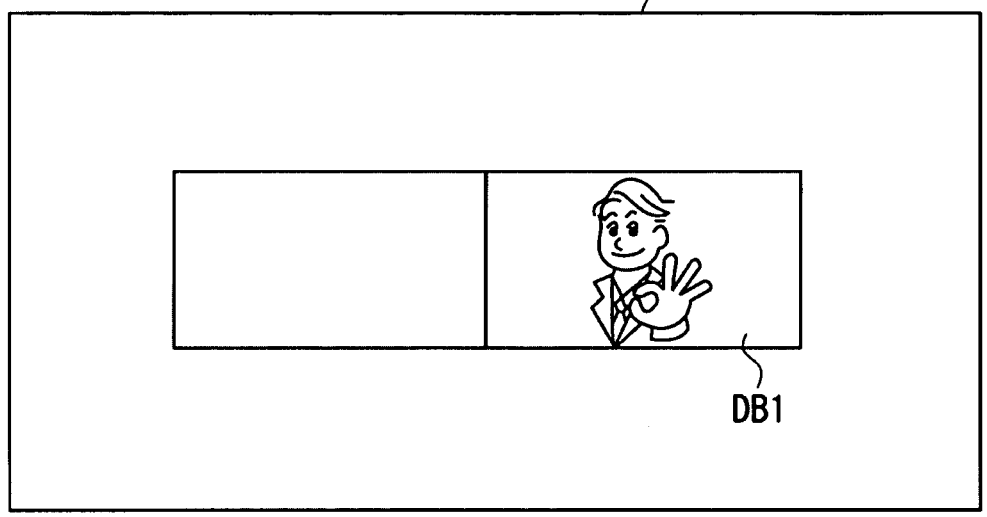
FIG. 10 exemplifies a chat screen according to the embodiment.

On the other hand, once the client apparatus 1B receives the start instruction data transmitted from the client apparatus 1A, a chat screen CH2 as shown in FIG. 10 is displayed on the monitor 10B. A video image DB1, which corresponds to a video signal input from a video camera 11B connected to the client apparatus 1B, is displayed on the right side of the chat screen CH2. The client apparatus 1B stands by until video data is transmitted from the client apparatus 1A in order to display the aforementioned video image corresponding to the video data transmitted from the client apparatus 1A on the left side of the screen. Moreover, the client apparatus 1B transmits to the client apparatus 1A via a communication unit 80B the video data corresponding to the video signal input from the video camera 11B connected to the client apparatus 1B, and audio data corresponding to voice input from a microphone 12B as chat streaming data (Step S11).

Note that in Step S11, the client apparatus 1A and 1B respectively transmit chat streaming data according to the topology decided in the aforementioned Step S5, which is also topology indicated in the examination results data. Moreover, the client apparatus 1A and 1B respectively transmit video data according to the transmission quality decided in the aforementioned Step S5, which is also transmission quality indicated in the examination results data, as the video data included in the chat streaming data.

Figure 11:
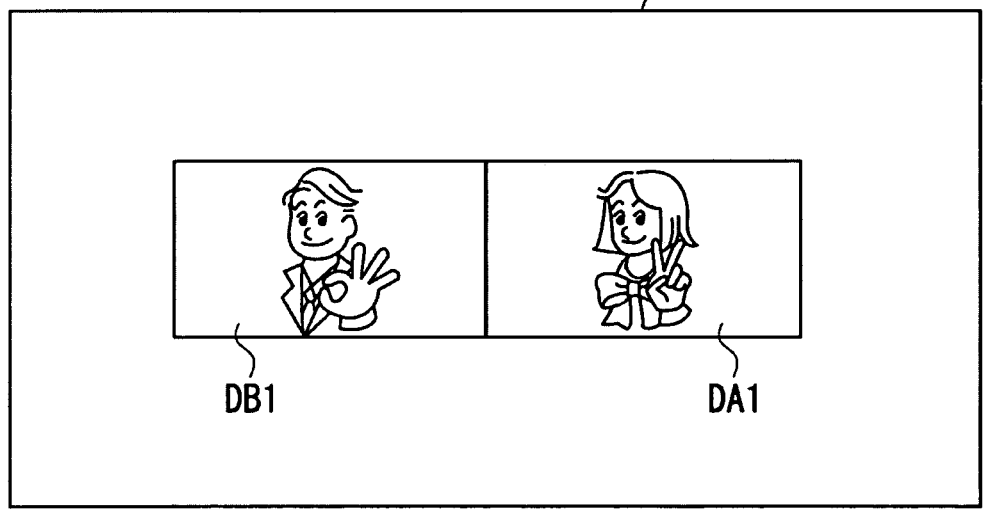
FIG. 11 exemplifies a chat screen according to the embodiment.
Figure 12:
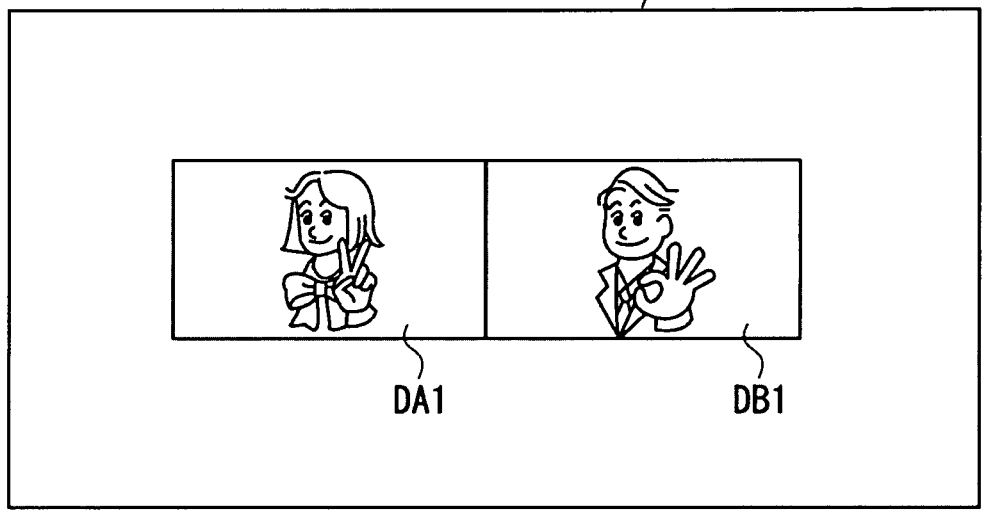
FIG. 12 exemplifies a chat screen according to the embodiment.

Each of the client apparatus 1 displays on the right side of the chat screen the video image corresponding to the video signal from the video camera 11 connected to each client apparatus 1, and displays on the left side of the chat screen the image represented by the video data transmitted from other apparatus. As a result, the client apparatus 1A displays a chat screen CH3 on the monitor 10A as shown in FIG. 11. The client apparatus 1B displays a chat screen CH4 on the monitor 10B as shown in FIG. 12. Moreover, the respective client apparatus 1 output voice represented by the audio data transmitted from the other apparatus from a speaker 63. As a result, the users of the respective apparatus 1 may converse while viewing a video image of the user of the other apparatus.

Note that once the user of the client apparatus 1 operates the controller 20 connected to the client apparatus 1 to give a command to display the aforementioned menu screen MG, a chat room icon (not shown in the drawing) representing a chat room for the AV chat in which the users A and B are participating may be displayed on the menu screen MG displayed on the monitor 10.

<Increase in Number of Participants>

Figure 13:
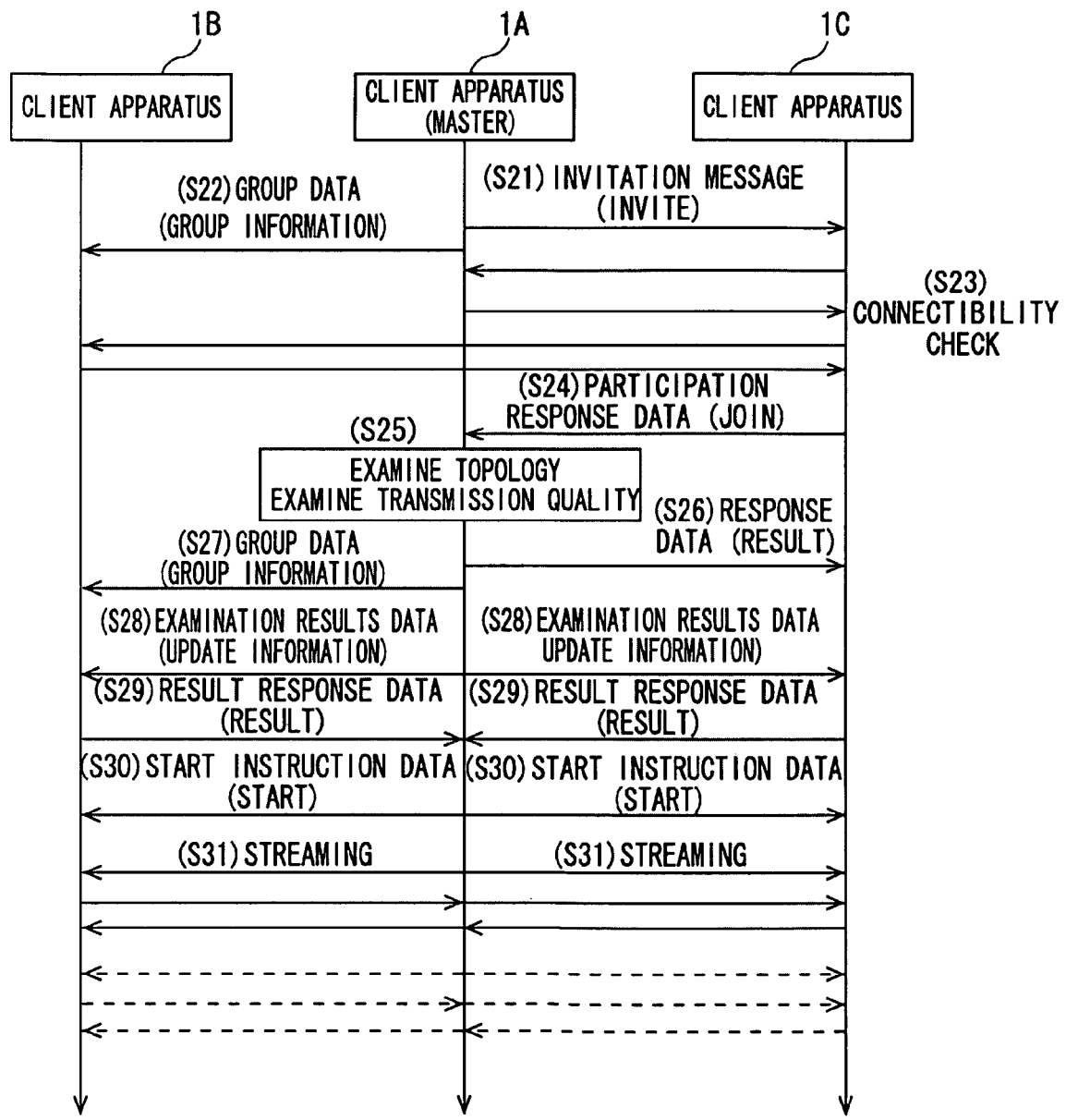
FIG. 13 is a sequence chart describing a processing flow for client apparatus 1A, 1B, and 1C according to the embodiment.

Next, operation flow in the case of the client apparatus 1A further inviting the user of the client apparatus 1C to AV chat is described while referencing FIG. 13. FIG. 13 is a sequence chart describing flow for data communication between the client apparatus 1A, 1B, and 1C. Note that descriptions of the same respective elements as given above are omitted.

It is assumed that the user A of the client apparatus 1A has operated the controller 20A to display the menu screen MG while AV chatting with the client apparatus 1B. In addition, it is assumed that friend information of a user other than the user B (referred to as user C here) has been selected from the friend information displayed on the menu screen MG and a command for inviting the user C, which is indicated in the friend information, to the AV chat has been given. Then, an invitation message for the client apparatus 1C is displayed in Step S21, which is the same as the above-given Step S1. Once the user C operates a controller 20C to give a command of participation, the client apparatus 1C conducts a connection check with the respective client apparatus 1A and 1B in Step S23, which is the same as the above-given Step S3. On the other hand, the client apparatus 1A transmits group data indicating to the effect that the user C is participating to the client apparatus of the user already participating in the AV chat (the client apparatus 1B in this case) in Step S22. The group data includes user ID of the client apparatus 1C, for example.

Once the client apparatus 1C determines to be connectible with the client apparatus 1A and 1B, it transmits participation response data to the client apparatus 1A in Step S24, which is the same as the above-given Step S4. The client apparatus 1A decides topology and transmission quality in Step S25, which is the same as Step S5. Since the number of participating users is 3 in this case, transmission quality is decided as QVGA and 30 fps, for example, according to the correspondence relationships given in FIG. 8. Moreover, the topology decided here is a full mesh-type including three nodes of the client apparatus 1A, 1B, and 1C each connected to all of the other nodes. Next, after proceeding to Step S26, which is the same as Step S6, the client apparatus 1A transmits to the client apparatus 1B group data indicating to the effect of accepting participation of the client apparatus 1C in Step S27 (Step S27). In addition, in step S28, which is the same as the above-given Step S8, the client apparatus 1A transmits the topology and transmission quality decided in Step S25 as examination results data to the client apparatus 1B and 1C.

Since subsequent Steps S29 and S30 are the same as the above-given Steps S9 and S10, description thereof is omitted. Note that in Step S31, the client apparatus 1A, 1B and 1C respectively transmit chat streaming data according to the topology decided in the above-given Step S25, which is also topology indicated in the examination results data. Moreover, the client apparatus 1A, 1B and 1C respectively transmit video data according to the transmission quality decided in the above-given Step S25, which is also transmission quality indicated in the examination results data, as the video data included in the chat streaming data. Accordingly, the transmission quality decided in Step S5 described above is changed to transmission quality decided in the above-given Step S25 and then video data is transmitted.

Figure 14:
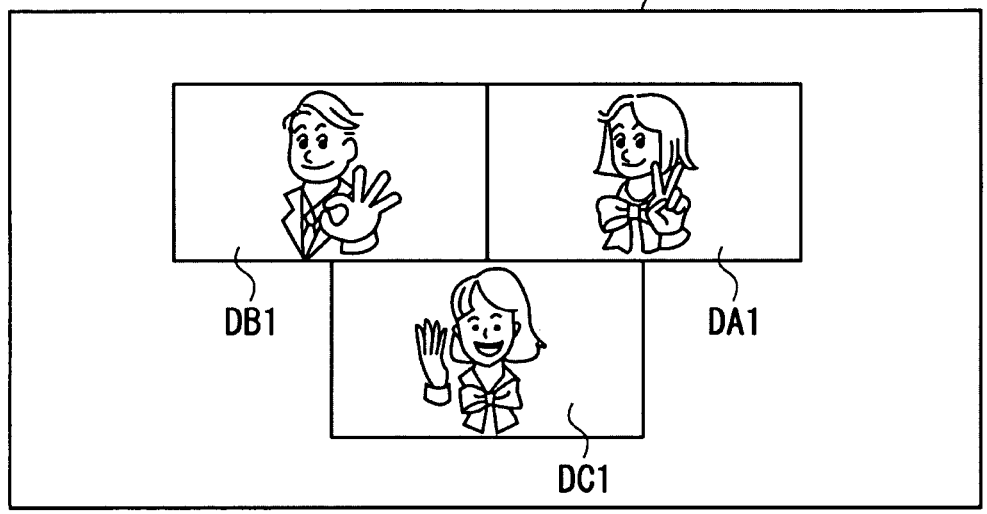
FIG. 14 exemplifies a chat screen according to the embodiment.

As a result, a chat screen CH5 as shown in FIG. 14, for example, is displayed on the monitor 10A of the client apparatus 1A. Images of the respective users participating in the AV chat are displayed smaller on the chat screen CH5 than on the chat screen CH3 of FIG. 11. This is because resolution with the transmission quality decided in the above-given Step S25 has been changed from VGA to QVGA. In addition, similarly, frequency of updating each video frame is slower than that on the chat screen CH3 of FIG. 11. This is because transmission frequency with the transmission quality decided in the above-given Step S25 has been changed from 60 fps to 30 fps.

Note that when further increasing number of users participating in the AV chat, namely, when other client apparatus 1 aside from the client apparatus 1A, 1B, and 1C participating in the communication group conducting the AV chat and thereby increasing the number of client apparatus 1 belonging to the communication group, the same processing of Steps S21 through S31 is performed. Also note that the when the client apparatus 1A determines that the number of participating users reaches 6, it controls such that a command of inviting to the AV chat cannot be accepted even if the user selects desirable friend information on the above-given menu screen MG.

<Decrease in Number of Participants>

Figure 15:
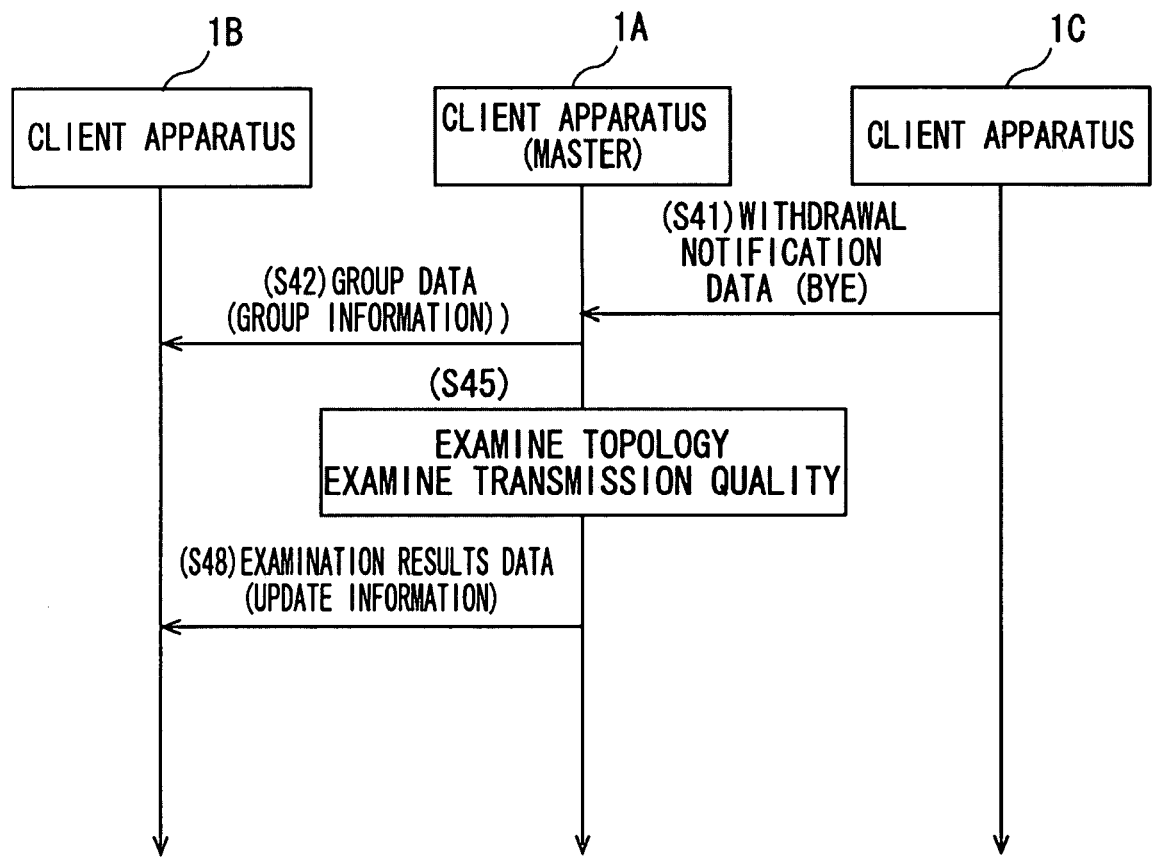
FIG. 15 is a sequence chart describing a processing flow for client apparatus 1A, 1B, and 1C according to the embodiment.

Next, the case of decreasing the number of participating users is described. For example, the case where the client apparatus 1C withdraws from the AV chat is described while referencing FIG. 15.

For example, once the user C of the client apparatus 1C operates the controller 20C to give a command to withdraw from the AV chat (withdrawal from the communication group conducting the AV chat), the client apparatus 1C transmits to the client apparatus 1A withdrawal notification data indicating withdrawal from the AV chat (Step S41). This withdrawal notification data includes user ID of the user C. Once the client apparatus 1A receives the withdrawal notification data transmitted from the client apparatus 1C, the client apparatus 1C of the user C transmits to client apparatus of all other users participating in the AV chat (client apparatus 1B in this case) group data indicating to the effect of withdrawing from the chat (Step S42). The client apparatus 1A then decides the topology and transmission quality in Step S45, which is the same as the aforementioned Step S5. Since the number of participating users is 2 in this case, transmission quality is decided as VGA and 60 fps, for example, according to the correspondence relationships given in FIG. 8. The client apparatus 1A transmits to the client apparatus 1B the topology and transmission quality decided in Step S45 as examination results data in step S48, which is the same as the above-given Step S8.

Figure 16:
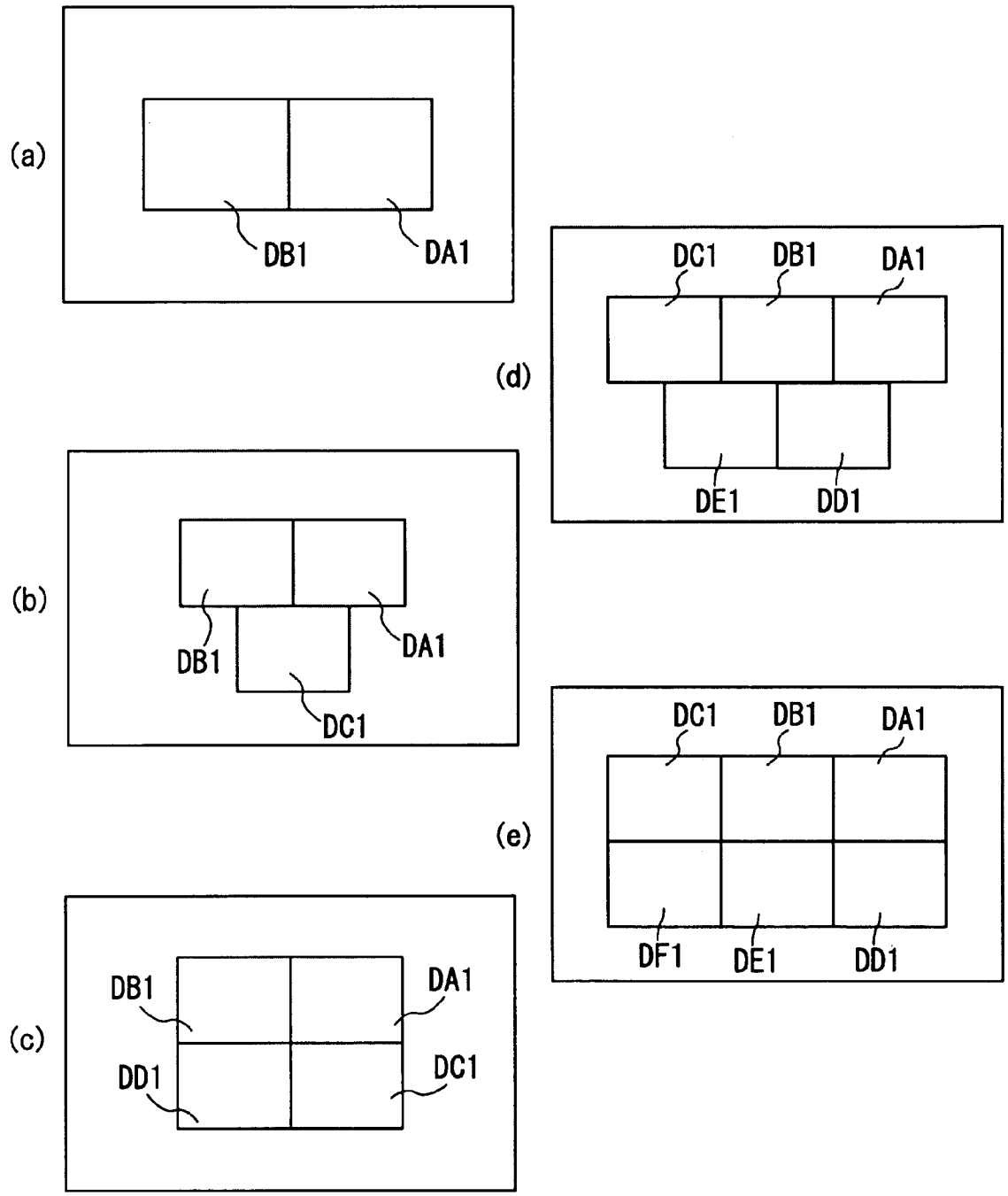
FIGS. 16(a), (b), (c), (d), and (e) each exemplifies a chat screen according to the embodiment.

Through such a sequence of operations, the transmission quality of the video data is changed according to the number of users participating in the AV chat (referred to as participating users hereafter). For example, as shown in FIG. 16, the chat screen changes in order of (a), (b), (c), (d), and (e) each time the number of participating users increases one by one from two people. DA1, DB1, DC1, DD1, DE1, and DF1 shown on these screens are respectively video images corresponding to the video data transmitted from the client apparatus 1 of the other users participating in the AV chat and also corresponding to a video image according to the video signal from its own video camera 11. On the contrary, the chat screen changes in order of (e), (d), (c), (b), and (a) each time the number of participating users decreases one by one from six people. Moreover, according to the aforementioned correspondence relationships given in FIG. 8, regarding display of the respective video images of the other users, update frequency of the video image is approximately 60 fps in the case of (a), 30 fps in the case of (b) and (c), and 20 fps in the case of (d) and (e).

According to such structure, the transmission quality of video data is adjusted according to the number of participating users in this embodiment. According to such structure, even if the number of participating users increases, increase in amount of video data transmission may be controlled, and decrease in transmission efficiency may be controlled. Moreover, when the number of participating users has decreased, video data with a higher quality than before the number of participating users is decreased may be provided due to the change in transmission quality. However, when the number of participating users decreases, it may be structured such that change in transmission quality is not carried out by not performing the aforementioned Step S45.

MODIFIED EXAMPLES

Modified Example 1

When deciding the aforementioned transmission quality, the correspondence relationships of number of participating users and transmission quality may be made to differ, for example, according to image quality of the chat screen displayed on the monitor 10. For example, a structure capable of setting image quality of the chat screen displayed on the monitor 10 to either high quality mode or standard quality mode may be provided. In Step S5, S25, or S45, transmission quality is then decided according to the correspondence relationships given in FIG. 8 in the case of high quality mode while it is decided according to the correspondence relationships given in FIG. 17 in the case of standard quality mode.

Moreover, resolution and transmission frequency are used as the transmission quality of the video data in the above embodiment. However, the present invention is not limited to this, and video (image) compression rate, color variation representing images, and the like may be used as transmission quality, and may be made variable according to the number of participating users.

Modified Example 2

Alternatively, the transmission quality may be decided according to profile information of the respective client apparatus 1 in the aforementioned Steps S5, S25, and S45. The profile information indicates connection environment and processing environment for the client apparatus. More specifically, for example, the connection environment indicates transmission band in which data transmission and reception are carried out. The processing environment indicates CPU availability, and consumable amount of memory such as the main memory 43. For example, when the client apparatus 1 includes a multiprocessor system, CPU availability may indicate available number of sub processors. For example, in FIG. 18, the connection environment is divided into two: case where the transmission band is 500 kbps or greater (broad band) and case where it is less than 500 kbps (narrow band). Moreover, the processing environment is divided into two: high-consumption environment and low-consumption environment. The high-consumption environment is an environment having high CPU availability and consumable large capacity of memory. The low-consumption environment is an environment having lower CPU availability and consumable low capacity of memory than those of the high-consumption environment. Each of the client apparatus 1 determines the environment in which it runs and generates profile information. For example, the case of a high-consumption environment and a broad band is set as 'Environment 1', the case of a high-consumption environment and a narrow band is set as 'Environment 2', the case of a low-consumption environment and a broad band is set as 'Environment 3', and the case of a low-consumption environment and a narrow band is set as 'Environment 4', and information indicating one of these 'Environment 1' through 'Environment 4' is generated as the profile information. These 'Environment 1' l through 'Environment 4' are favorable environments in order of the numbers thereof. The respective client apparatus 1 other than the master transmit the profile information generated as such along with the participation response data to the master client apparatus 2A in the aforementioned Step S4 or S24. Upon reception of the profile information from the respective client apparatus 1, the client apparatus 1A examines these pieces of profile information and its own profile information to decide working mode. Working mode is a mode for distinguishing multiple correspondence relationships between number of participating users and transmission quality if they are set. For example, FIG. 19 gives correspondence relationships between profile information and working mode. 'Mode 1' in this diagram is associated to the correspondence relationships given in FIG. 8 while 'Mode 2' in this diagram is associated to the correspondence relationships given in FIG. 17. The client apparatus 1A extracts the most unfavorable environment from Environment 1 through Environment 4 indicated in the respective profile information. It selects the working mode corresponding to the extracted environment, and then decides the transmission quality according to the number of participating users while referencing the working mode. For example, 'Mode 1' is selected when 'Environment 1' is indicated in all of the profile information.

Note that even in another step than the aforementioned Step S4 or S24, the respective client apparatus 1 may transmit to the master client apparatus 1A the profile information indicating the environment when change in the connection environment and processing environment are detected. The master client apparatus 1A may carry out processing of deciding transmission quality in the above manner each time profile information is received from the respective client apparatus 1.

According to such a structure, load imposed on the client apparatus 1 may be reduced even if the connection environment and processing environment of the client apparatus of the users participating in the AV chat are unfavorable.

Modified Example 3

When reproducing other contents while the aforementioned AV chat program is running, the client apparatus 1A may decide transmission quality in Step S5, S25, or S45 according to different correspondence relationships than when not reproducing other contents. Note that contents are images, game programs, and the like, and reproduction of the contents is reproduction or execution thereof. In the case of executing only the AV chat program, transmission quality may be decided according to the correspondence relationships given in FIG. 8 while in the case of reproducing contents other than the AV chat program, the transmission quality may be decided according to the correspondence relationships given in FIG. 20, for example.

Figure 21:
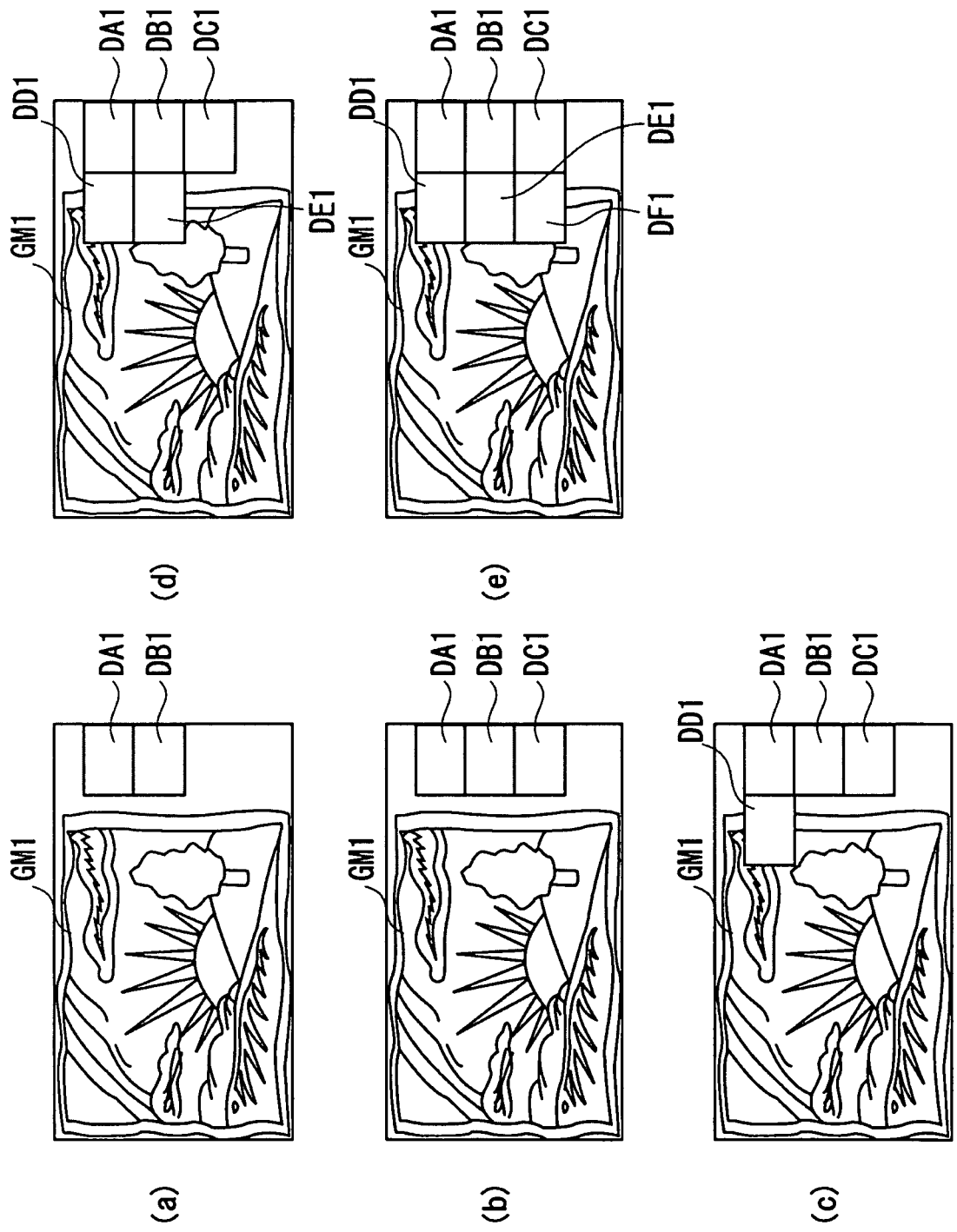
FIG. 21 exemplifies correspondence relationships between number of participating users and transmission quality according to a modification of the embodiment of the present invention.

Moreover, size and position of chat images of the aforementioned participating users may be changed according to reproduction of contents during the AV chat. For example, as shown in FIG. 21(*a*), (*b*), (*c*), (*d*), and (*e*), display a game image GM1 on the left side of the screen and display a video image of the participating users on the right side of the screen while executing a game program. In this drawing, the chat screen changes in order of (a), (b), (c), (d), and (e) each time the number of participating users increases one by one from two people. DA1, DB1, DC1, DD1, DE1, and DF1 shown on these screens are respectively a video image corresponding to the video data transmitted from the client apparatus 1 of the other users participating in the AV chat and also according to a video image according to the video signal from its own video camera 11. On the contrary, the chat screen changes in order of (e), (d), (c), (b), and (a) each time the number of participating users decreases one by one from six people. At this time, video images according to image data transmitted from the client apparatus 1 of the other participating users may be reduced or enlarged and displayed according to the number of participating users. Moreover, a display region for displaying video images of the participating users may be provided, and position and size of the images may be adjusted so that the video images of the users fit in the display region according to the number of the participating users.

Furthermore, for example, it may be structured so as to coordinate the game program and the AV chat program to control to display the video images of the participating users according to progression of the game, for example. For example, control so as to display the images of the participating users at times when game status is a predetermined status whereas not display them at times when not in the predetermined status. Alternatively, positions of displaying the images of the participating users may be controlled according to game content. For example, in the case of a game in which characters are displayed in a game image and when users are participating in the AV chat, control so as to display images of participating users in display positions of the characters.

Modified Example 4

In the case where the client apparatus 1A executes the AV chat program while reproducing the aforementioned other contents and where the reproducing contents include display mode specifying information, the client apparatus 1A may display a chat image in a display position of the monitor 10 specified in the display mode specifying information read out according to reproduction of contents. Note that the contents are predetermined programs such as a game program, and the display mode specifying information is read out by executing (reproducing) the predetermined program. Moreover, the contents include various contents reproducible by the client apparatus 1A such as those stored on a storage medium, such as an optical disk, those stored on the HD 45 (including those downloaded via the Internet 30), and the like. Furthermore, the contents may include multiple pieces of display mode specifying information so as to change the display positions of the chat images according to progression of the content reproduction (e.g., progression of a game).

Figure 22:
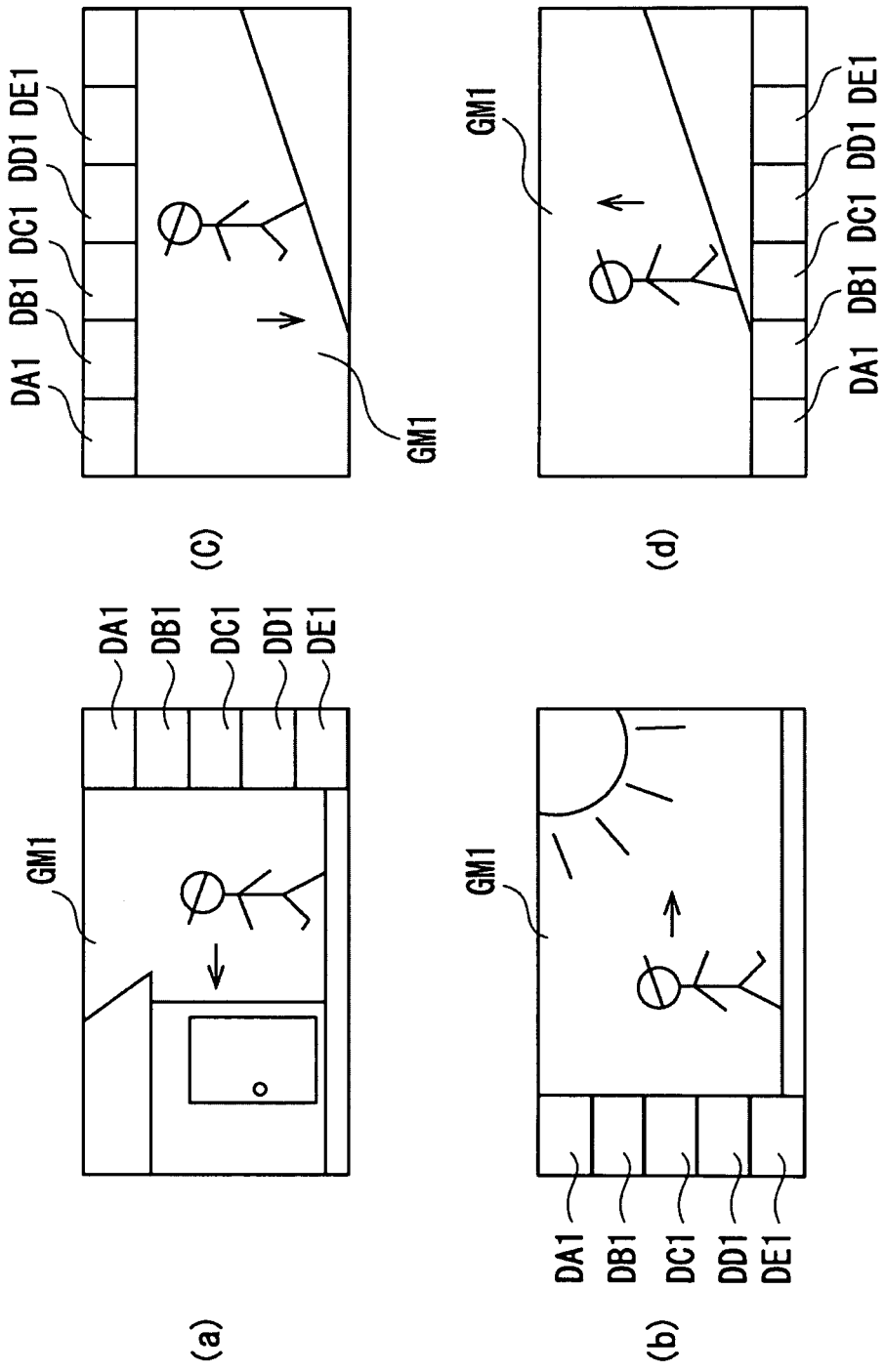
FIG. 22 exemplifies a position of a chat screen according to a modification of the embodiment of the present invention.

For example, when the content is a game program, display mode specifying information is set and stored such that the chat images superpose on a relatively unimportant (does not interrupt progression of the game) region in progression of the game within the game image GM1. More specifically, as shown in FIG. 22(*a*), in a scene where direction of movement of a character is set to the left of the game image GM1, the display mode specifying information may be set so as to display the video images DA1, DB1, DC1, DD1 and DE1 of the chat screen on the right side of the game image GM1. Similarly, as shown in FIG. 22(*b*), (*c*), and (*d*), in scenes where direction of movement of the character is set to the right of, below, and above the game image GM1, the display mode specifying information may be set so as to display the video images DA1, DB1, DC1, DD1 and DE1 of the chat screens on the left side of, above, and below the game image GM1. Note that the number of images on the chat screen is changed according to the number of participating users, and the example of FIG. 22 shows the case where the participating users is 5.

Next, processing for executing the graphic system 50 in the client apparatus 1A is described while referencing FIG. 2 in the case when AV chat is carried out between the client apparatus 1B and 1C while the game program (other content) is running and the game program includes the display mode specifying information.

First, image data (its own chat image data) provided from the video camera 11 and image data (other users' chat image data) received by the communication unit 80 from the other client apparatus 1B and 1C (shown in FIG. 1) are temporarily written in a buffer within the main memory 43A. When the image data provided from the video camera 11 and the image data received from the other client apparatus 1B and 1C is compressed, the data is decoded and then written in the buffer. Note that the place where the buffer in which the respective chat image data is written in is not limited to within the main memory 43 and may be in another storage region.

Next, its own chat image data and the other users' chat image data are read out from the buffer within the main memory 43, and according to the display mode specifying information sequentially provided from the game program in accordance with progression of the game, the read out respective chat image data is written in the frame buffer 53 (respective chat images are rendered on the frame buffer 53).

The display mode specifying information includes display position specifying information, which stipulates position, width, and height of center coordinates of regions displaying the respective own video image and other users' video images, and information stipulating permeability (e.g., a value). Moreover, the display mode specifying information may include information stipulating amount of rotation along the X axis, amount of rotation along the Y axis, and amount of rotation along the Z axis.

Processing for writing the respective chat image data in the frame buffer 53 may be executed according to the AV chat program or the game program. In the case where the processing is executed by the AV chat program, a game image is rendered on the frame buffer 53 according to the game program, and the respective chat images are overwritten on that game image according to the AV chat program. On the other hand, in the case where the processing is executed by the game program, the respective chat image data is provided to the game program side from the buffer within the main memory 43 by the AV chat program, and in the processing executed by the game program, the chat images are rendered on the frame buffer 53 incorporated onto the game image. Namely, the chat images are overwritten on the game image when the processing depends on the AV chat program, and the chat images are rendered as a part of the game image by being incorporated onto the game image when the processing depends on the game program.

Moreover, multiple display mode patterns (respective parameters stipulating the aforementioned position, width, and height of center coordinates, amount of rotation along the X axis, amount of rotation along the Y axis, and amount of rotation along the Z axis, and permeability) according to number of participants and resolution may be stored in advance in the main memory of the client apparatus 1A. In this case, the display mode specifying information including the game program (other content) need only be information specifying the display mode patterns.

Modified Example 5

In the above-given embodiment, the video camera 11 is connected to the respective client apparatus 1, and the respective client apparatus 1 of the AV chat participating users are structured so as to transmit video data according to images videotaped by the video camera 11 to other participating users' client apparatus 1. However, when a client apparatus 1 not connected to the video camera (referred to as unconnected apparatus) participates in the communication group conducting AV chat, it participates speech-based in the AV chat by transmitting audio data according to voice input to the microphone 12 to other client apparatus 1 belonging to the communication group. Moreover, the respective client apparatus 1 belonging to the communication group may display an avatar, which is stored as user information of the user of the unconnected apparatus, as a user image on the chat screen.

Furthermore, in the above-given embodiment, the client apparatus 1 is structured so as to also display on the chat screen an image videotaped by the video camera 11 connected to itself. However, it may be structured so as not to display this video image on the chat screen.

Modified Example 6

In the above-given embodiment, the controller 20 and the client apparatus 1 are connected via the cable 13 to conduct communication. However, it may be a structure such that the controller 20 and the client apparatus 1 conduct wireless communication without a cable by a communication method such as Bluetooth (registered trademark), for example.

Moreover, communication conducted among the respective client apparatus 1 or between the client apparatus 1 and the server apparatus 2 may be wire communication or wireless communication. Furthermore, while the client apparatus 1 and the server apparatus 2 are connected via the Internet 30, they may be connected via another network.

Alternatively, while the client apparatus 1, the monitor 10, the video camera 11, the microphone 12, and the controller 20 are structured individually in the above-given embodiment, at least one of these may be integrated with the client apparatus 1. Moreover, while the speaker 63 is embedded in the client apparatus 1, it may be structured separately from the client apparatus 1 and connected wired or wireless thereto.

Note that the connection state when multiple client apparatus 1 are communicating may be another connection state than the aforementioned full mesh type.

Moreover, selection of the master client apparatus 1 may be random. For example, it may be selected by using a random number, or by a predetermined method. Alternatively, it may structured such that the respective client apparatus 1 manage information of users participating in the AV chat and information of the users' client apparatus 1 without selecting a master client apparatus. Further alternatively, the aforementioned server apparatus 2 may function as a master.

Furthermore, the aforementioned AV chat system is structured such that other users participate in the AV chat by being invited by the user A of the master client apparatus 1A. However, the present invention is not limited to this. It may be structured so that the client apparatus 1, by directions given by the user, virtually generates a chat room for AV chatting so that other arbitrary users desiring to participate in the chat room may AV chat. For example, the client apparatus 1 is connected to the client apparatus generated in the chat room by the other users performing a predetermined login operation with its own client apparatus 1. This allows the other users to virtually enter the chat room and AV chat.

Modified Example 7

Note that the communication group to which a client apparatus 1 may belong to is not limited to 1, and there may be multiple groups. Namely, the user of a client apparatus 1 may participate different multiple communication groups conducting AV chat and AV chatting with each communication group. In this case, with the client apparatus 1, once the user operates the controller 20 and gives a command to switchover the chat screen, a chat screen of a communication group switches over to a chat screen of another communication group. The client apparatus 1 then transmits and receives chat streaming data with other client apparatus 1 belonging to the communication group for which the chat screen is displayed on the monitor 10. At this time, the client apparatus 1 does not transmit and receive chat streaming data with client apparatus 1 belonging to other communication groups. With such a structure, for example, indicators may be associated with participating users' images displayed on the chat screen and displayed, and colors of the indicators may be changed for those transmitting and receiving data and those not transmitting and receiving data.

The above-given descriptions of the embodiments are merely examples of the present invention. Thus, the present invention is not limited to the above-given embodiments, and needless to say that various modifications are possible even outside of the above-given embodiments without departing from the technical scope of the present invention.

INDUSTRIAL APPLICABILITY

The present invention is preferred to be utilized for communication systems of transmitting and receiving video data and audio data among multiple communication apparatus belonging to a predetermined communications group.

The invention claimed is:

1. A communication system in which a communication apparatus, which belongs to a predetermined communication group formed by a plurality of communication apparatus connected to a network, transmits to another communication apparatus belonging to the communication group, video data according to an image shot by an image shooting means and audio data according to voice input from a sound input means, receives video data and audio data transmitted from the other communication apparatus, displays on a display means a video image represented by the video data, and outputs voice represented by audio data to an audio output means; said communication system comprising:
   determination means for determining the number of communication apparatus belonging to the communication group;
   decision means for determining transmission quality of the video data as an inverse function of the number determined by the determination means, such that as the number increases at least one characteristic of the transmission quality decreases, wherein such characteristics include a resolution of the video data and a frame rate of the video data, wherein the plurality of communication apparatus transmits the video data according to the transmission quality decided by the decision means; and
   display control means for controlling display sizes for displaying on the display means at least the video data transmitted from the other communication apparatus, wherein the display sizes are adjusted as a function of the number of communication apparatus belonging to the communication group,
   wherein each of the plurality of communication apparatus of the predetermined communication group has a processing environment and a connection environment, and the processing environment indicates at least one of CPU availability of the communication apparatus and consumable amount of memory of the communication apparatus,
   wherein the decision means operates to determine: (i) an environment factor indicating a comparison of a combination of the processing environment and the connection environment of the communication apparatus to a predetermined scale of possible combinations of the processing environment and the connection environment, and (ii) a least favorable environment factor of the processing environment and the connection environment among the plurality of communication apparatus of the predetermined communication group,
   wherein the decision means decides the transmission quality of the video data according to the least favorable environment factor and the number of communication apparatus belonging to the communication group, such that at least one of the resolution and the frame rate of the video data decreases when at least one of the least favorable environment factor and the number of communication apparatus worsens.

2. The communication system according to claim 1, wherein the communication apparatus displays the video image represented by the video data and the image shot by the image shooting means.

3. The communication system according to claim 1, wherein the communication apparatus comprises:
   reproducing means for reproducing contents,
   wherein the display control means further operates to control the display size for displaying on the display means at least either an image shot by the image shooting means or the video data transmitted from the other communication apparatus according to whether the reproducing means is reproducing contents.

4. The communication system according to claim 1, wherein the communication apparatus comprises:
   reproducing means for reproducing contents including display position specifying information specifying image display position; and
   the display control means further operates to display the video image, in a case of displaying on the display means at least either the image shot by the image shooting means or the image corresponding to the video data transmitted from the other communication apparatus while contents are being reproduced by the reproducing means, at a display position specified by display position specifying information read out by the reproducing means in accordance with reproduction of the contents.

5. The communication system according to claim 1, wherein the predetermined scale of possible combinations of the processing environment and the connection environment for each of the plurality of communication apparatus of the predetermined communication group, includes:
   a most favorable level in which both the processing environment and the connection environment are favorable;
   a next favorable level in which the processing environment is favorable and the connection environment is unfavorable;
   a further next favorable level in which the processing environment is unfavorable and the connection environment is favorable; and
   a least favorable level in which both the processing environment and the connection environment are unfavorable.

6. A communication apparatus, which belongs to a predetermined communication group formed by a plurality of communication apparatus connected to a network, comprising:
   communication means for transmitting to another communication apparatus belonging to the communication group, video data corresponding to an image shot by an image shooting means and audio data corresponding to voice input from a sound input means, and receiving video data and audio data transmitted from the other communication apparatus;
   determination means for determining the number of communication apparatus belonging to the communication group;
   decision means for determining transmission quality of the video data as an inverse function of the number determined by the determination means, such that as the number increases at least one characteristic of the transmission quality decreases, wherein such characteristics include a resolution of the video data and a frame rate of the video data;
   quality notification means for transmitting to the other communication apparatus belonging to the predetermined communication group, quality request data requesting transmission of the video data according to the transmission quality decided by the decision means; and display control means for controlling display sizes for displaying on the display means at least the video data transmitted from the other communication apparatus, wherein the display sizes are adjusted as a function of the number of communication apparatus belonging to the communication group, wherein each of the plurality of communication apparatus of the predetermined communication group has a processing environment and a connection environment, and the processing environment indicates at least one of CPU availability of the communication apparatus and consumable amount of memory of the communication apparatus, wherein the decision means operates to determine: (i) an environment factor indicating a comparison of a combination of the processing environment and the connection environment of the communication apparatus to a predetermined scale of possible combinations of the processing environment and the connection environment, and (ii) a least favorable environment factor of the processing environment and the connection environment among the plurality of communication apparatus of the predetermined communication group, wherein the decision means decides the transmission quality of the video data according to the least favorable environment factor and the number of communication apparatus belonging to the communication group, such that at least one of the resolution and the frame rate of the video data decreases when at least one of the least favorable environment factor and the number of communication apparatus worsens.

7. A communication method, which is executed by a computer included in a communication apparatus belonging to a predetermined communication group formed by a plurality of communication apparatus connected to a network, comprising the steps of:

transmitting to another communication apparatus belonging to the communication group, video data according to an image shot by an image shooting means and audio data according to voice input from a sound input means;

receiving video data and audio data transmitted from the other communication apparatus;

determining the number of communication apparatus belonging to the communication group;

deciding transmission quality of the video data as an inverse function of the number determined by a determination means and the processing capability, such that as the number increases at least one characteristic of the transmission quality decreases, wherein such characteristics include a resolution of the video data and a frame rate of the video data;

transmitting to the other communication apparatus belonging to the predetermined communication group, quality request data requesting transmission of the video data according to the transmission quality decided by a decision means;

receiving updates regarding change in respective processing capability from one or more of the plurality of communication apparatus;

updating the transmission quality decided by the decision means based on the received updates;

transmitting to the other communication apparatus belonging to the predetermined communication group, quality request data requesting transmission of the video data according to the updated transmission quality; and controlling display sizes for displaying at least the video data transmitted from the other communication apparatus, wherein the display sizes are adjusted as a function of the number of communication apparatus belonging to the communication group, wherein each of the plurality of communication apparatus of the predetermined communication group has a processing environment and a connection environment, and the processing environment indicates at least one of CPU availability of the communication apparatus and consumable amount of memory of the communication apparatus, wherein the decision means operates to determine: (i) an environment factor indicating a comparison of a combination of the processing environment and the connection environment of the communication apparatus to a predetermined scale of possible combinations of the processing environment and the connection environment, and (ii) a least favorable environment factor of the processing environment and the connection environment among the plurality of communication apparatus of the predetermined communication group, wherein the decision means decides the transmission quality of the video data according to the least favorable environment factor and the number of communication apparatus belonging to the communication group, such that at least one of the resolution and the frame rate of the video data decreases when at least one of the least favorable environment factor and the number of communication apparatus worsens.

8. A non-transitory computer-readable storage medium containing a communication program, which when executed by a computer included in a communication apparatus belonging to a predetermined communication group formed by a plurality of communication apparatus connected to a network, causes the apparatus to execute actions, comprising:

transmitting to another communication apparatus belonging to the communication group, video data according to an image shot by an image shooting means and audio data according to voice input from a sound input means;

receiving video data and audio data transmitted from the other communication apparatus;

determining the number of communication apparatus belonging to the communication group;

deciding transmission quality of the video data as an inverse function of the number determined by a determination means and the processing capability, such that as the number increases at least one characteristic of the transmission quality decreases, wherein such characteristics include a resolution of the video data and a frame rate of the video data;

transmitting to the other communication apparatus belonging to the predetermined communication group, quality request data requesting transmission of the video data according to the transmission quality decided by a decision means;

receiving updates regarding change in respective processing capability from one or more of the plurality of communication apparatus;

updating the transmission quality decided by the decision means based on the received updates;

transmitting to the other communication apparatus belonging to the predetermined communication group, quality request data requesting transmission of the video data according to the updated transmission quality; and controlling display sizes for displaying at least the video data transmitted from the other communication apparatus, wherein the display sizes are adjusted as a function of the number of communication apparatus belonging to the communication group, wherein each of the plurality of communication apparatus of the predetermined communication group has a processing environment and a connection environment, and the processing environment indicates at least one of CPU availability of the communication apparatus and consumable amount of memory of the communication apparatus, wherein the decision means operates to determine: (i) an environment factor indicating a comparison of a combination of the processing environment and the connection environment of the communication apparatus to a predetermined scale of possible combinations of the processing environment and the connection environment, and (ii) a least favorable environment factor of the processing environment and the connection environment among the plurality of communication apparatus of the predetermined communication group, wherein the decision means decides the transmission quality of the video data according to the least favorable environment factor and the number of communication apparatus belonging to the communication group, such that at least one of the resolution and the frame rate of the video data decreases when at least one of the least favorable environment factor and the number of communication apparatus worsens.

9. The method of claim 7, wherein the processing capability includes one or more of CPU (central processing unit) availability and consumable amount of memory.

10. The method of claim 7, further comprising generating display mode specifying information by at least one of the plurality of communication apparatus that executes other contents in addition to generating the video and audio data, wherein the display mode specifying information specifies one or more of position and size of video data to be displayed at the at least one communication apparatus.

11. The method of claim 10, wherein the display mode specifying information is provided by the other contents in accordance with progress in execution of the other contents.

12. The method of claim 11, wherein the other contents include at least a game program.

13. The communication system according to claim 1, further comprising a second communication group that comprises a second plurality of communication apparatus to which the communication apparatus belongs in addition to the predetermined communication group, such that the communication apparatus is able to switch between a first chat screen associated with the predetermined communication group and a second chat screen associated with the second communication group.

14. The communication system according to claim 13, wherein the communication apparatus receives and transmits audio-video data only with a communication group whose chat screen is currently displayed on the communication apparatus.

15. The communication system according to claim 14, wherein indicators associated with the plurality of communication apparatus and the second plurality of communication apparatus are displayed at the communication apparatus such that colors of indicators for those communicating apparatus transmitting to and receiving data from the communication apparatus are different from colors of indicators for those communicating apparatus that are not transmitting to or receiving data from the communication apparatus.

* * * * *